(12) United States Patent
Miike et al.

(10) Patent No.: US 11,281,894 B2
(45) Date of Patent: Mar. 22, 2022

(54) NON-BOARDED PASSENGER SEARCH DEVICE, NON-BOARDED PASSENGER SEARCH METHOD, AND RECORDING MEDIUM

(71) Applicant: NEC Solution Innovators, Ltd., Tokyo (JP)

(72) Inventors: Yukihiro Miike, Tokyo (JP); Yasuyuki Sasamoto, Tokyo (JP); Hiroaki Ohura, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 476 days.

(21) Appl. No.: 16/467,564

(22) PCT Filed: Dec. 15, 2017

(86) PCT No.: PCT/JP2017/045060
§ 371 (c)(1),
(2) Date: Jun. 7, 2019

(87) PCT Pub. No.: WO2018/116973
PCT Pub. Date: Jun. 28, 2018

(65) Prior Publication Data
US 2021/0357628 A1 Nov. 18, 2021

(30) Foreign Application Priority Data
Dec. 22, 2016 (JP) .............................. JP2016-249892

(51) Int. Cl.
*G06K 9/00* (2006.01)
*G06T 7/70* (2017.01)
(Continued)

(52) U.S. Cl.
CPC ..... *G06K 9/00288* (2013.01); *G06K 9/00255* (2013.01); *G06K 9/00926* (2013.01);
(Continued)

(58) Field of Classification Search
CPC .......... G06K 9/00288; G06K 9/00255; G06K 9/00926; G06Q 50/30; G06T 7/292;
(Continued)

(56) References Cited

U.S. PATENT DOCUMENTS

| 9,819,912 B2 * | 11/2017 | Maruta | .................... H04N 7/18 |
| 2003/0149343 A1 * | 8/2003 | Siegel | ...................... G07C 9/27 |
| | | | 600/300 |

(Continued)

FOREIGN PATENT DOCUMENTS

| JP | 2003182273 | * | 2/2003 | ............. G07B 15/00 |
| JP | 2007058763 A | | 3/2007 | |

(Continued)

OTHER PUBLICATIONS

Japanese Office Action for JP Application No. 2018-557733 dated Aug. 11, 2020 with English Translation.

(Continued)

*Primary Examiner* — Jerome Grant, II
(74) *Attorney, Agent, or Firm* — Sughrue Mion, PLLC

(57) ABSTRACT

A non-boarded passenger search device which searches for a non-boarded passenger includes an image registration unit that registers image data of faces of a plurality of scheduled passengers photographed before a predetermined passage point; a determination unit that determines whether a scheduled passenger whose face is photographed at the passage point is registered in the image registration unit; when the face is photographed at the passage point is registered, a fight number registration unit that registers a flight number which the scheduled passenger is scheduled to board, in association with image data of the face; and a presentation unit that presents position information of the scheduled passenger, based on the image data of the face of the scheduled passenger, the flight number, image data of the (Continued)

face of the scheduled passenger and position information of the plurality of photographing points.

18 Claims, 6 Drawing Sheets

(51) Int. Cl.
 *G06T 7/292* (2017.01)
 *G06Q 50/30* (2012.01)
 *H04N 7/18* (2006.01)
(52) U.S. Cl.
 CPC ............ *G06Q 50/30* (2013.01); *G06T 7/292* (2017.01); *G06T 7/70* (2017.01); *G06T 2207/30201* (2013.01); *G06T 2207/30241* (2013.01); *H04N 7/181* (2013.01)
(58) Field of Classification Search
 CPC ............ G06T 7/70; G06T 2207/30201; G06T 2207/30241; H04N 7/181
 USPC ........................................................ 382/103
 See application file for complete search history.

(56) References Cited

U.S. PATENT DOCUMENTS

| | | | | |
|---|---|---|---|---|
| 2007/0222620 | A1* | 9/2007 | Trammell | G01V 11/00 340/573.1 |
| 2015/0278618 | A1* | 10/2015 | Nuscheler | B64D 47/08 382/104 |
| 2016/0014382 | A1 | 1/2016 | Maruta | |
| 2016/0307042 | A1* | 10/2016 | Martin | G06F 16/5846 |
| 2016/0311646 | A1* | 10/2016 | Bryant | B66B 1/468 |
| 2018/0107877 | A1* | 4/2018 | Inaba | G06K 9/00677 |
| 2020/0074151 | A1* | 3/2020 | Resnick | G06K 9/00771 |
| 2021/0124910 | A1* | 4/2021 | Eom | B60R 25/25 |
| 2021/0233076 | A1* | 7/2021 | Prasad | G06Q 20/3224 |
| 2021/0241617 | A1* | 8/2021 | Matsugi | G08G 1/0962 |

FOREIGN PATENT DOCUMENTS

| | | | | | |
|---|---|---|---|---|---|
| JP | | 2009193424 A | | 8/2009 | |
| JP | | 2011215725 A | | 10/2011 | |
| JP | | 2014186650 | * | 10/2014 | ............... G07C 9/00 |
| JP | | 2014186650 A | | 10/2014 | |
| JP | | 5851651 B2 | | 2/2016 | |
| JP | | 0065534597 | * | 6/2019 | ............. G08B 25/04 |
| JP | | 006859364 | * | 4/2021 | ............. G06Q 50/30 |
| WO | | 2014/148395 A1 | | 9/2014 | |
| WO | | WO2018116973 | * | 6/2018 | ............. G06Q 50/30 |

OTHER PUBLICATIONS

"ITmedia Business Online, Wednesday Interview Theater, What kind of person gets on a plane last? Analyzing Haneda Airport", [online], [searched on Oct. 6, 2016], Internet, https://www.itmedia.co.jp/business/articles/1605/11/news013_5.html, pp. 1-4.
International Search Report, dated Feb. 27, 2018 from the International Bureau in counterpart International application No. PCT/JP2017/045060.

* cited by examiner

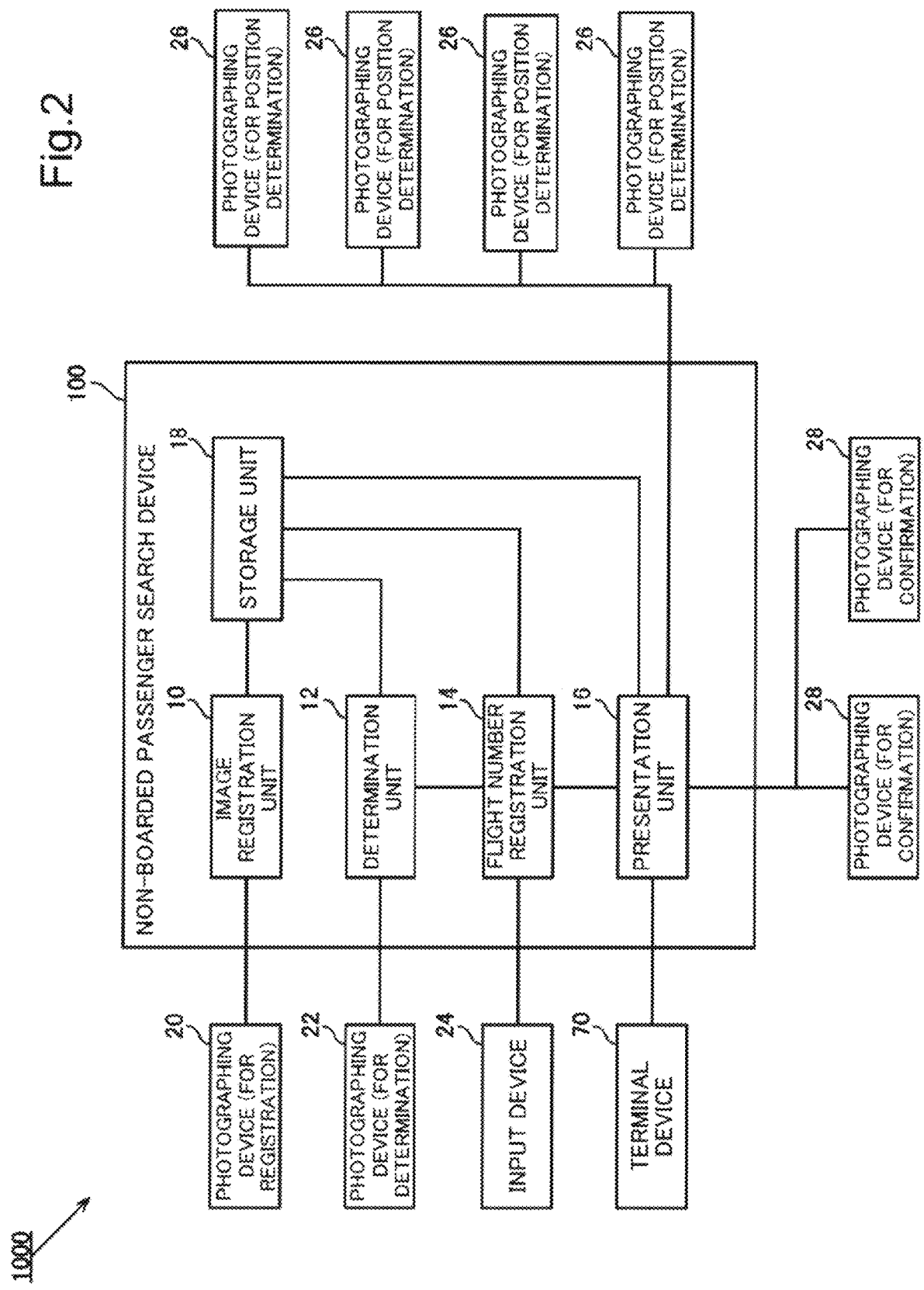

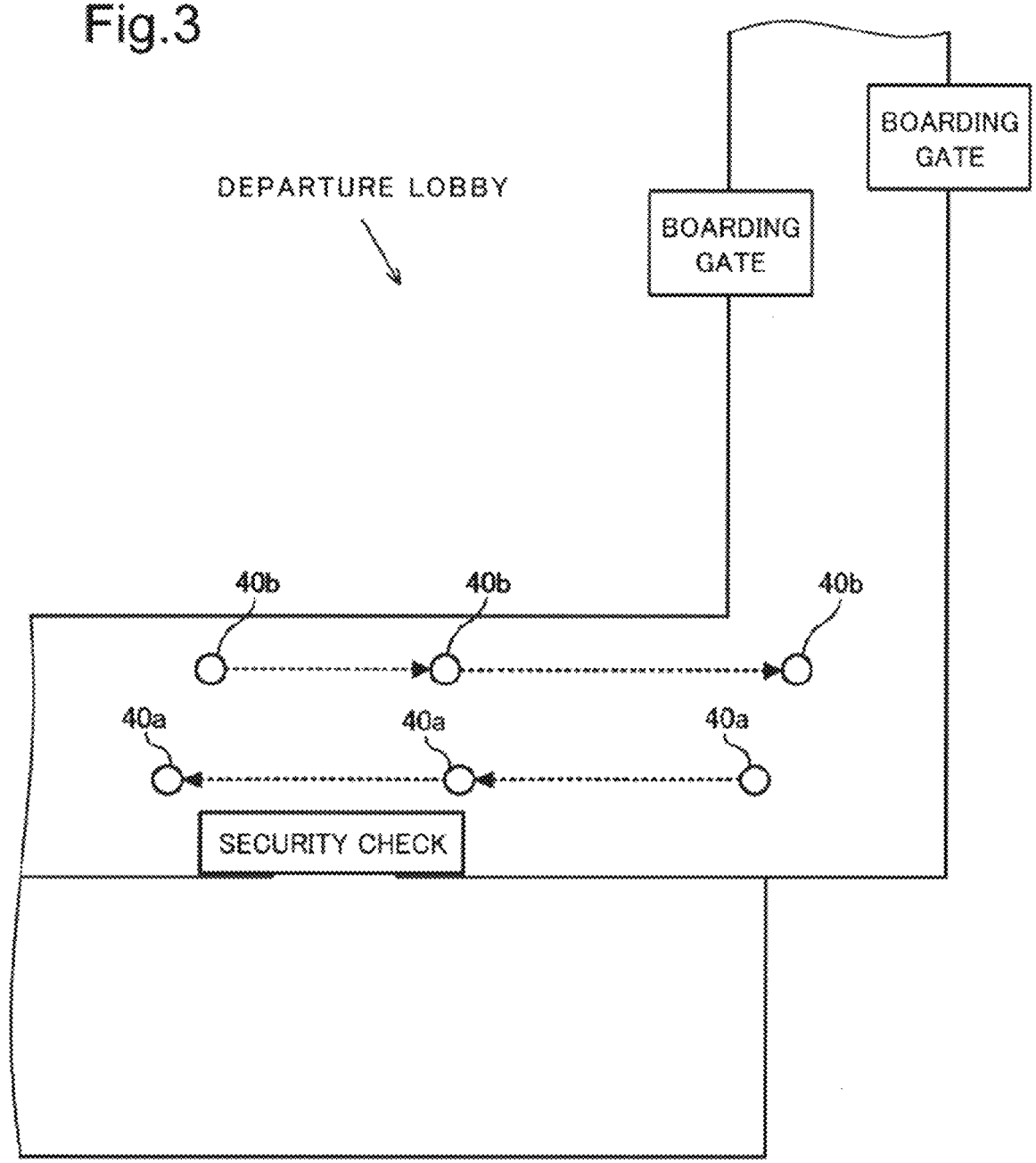

US 11,281,894 B2

NON-BOARDED PASSENGER SEARCH DEVICE, NON-BOARDED PASSENGER SEARCH METHOD, AND RECORDING MEDIUM

This application is a National Stage Entry of PCT/JP2017/045060 filed on Dec. 15, 2017, which claims priority from Japanese Patent Application 2016-249892 filed on Dec. 22, 2016, the contents of all of which are incorporated herein by reference, in their entirety.

TECHNICAL FIELD

One aspect of the present invention relates to a device, a method, and the like which search for a non-boarded passenger in a terminal building of an airport.

BACKGROUND ART

A traveler utilizing an aircraft is requested to pass a security check and a boarding gate by a predetermined time (e.g., 15 minutes and 10 minutes before a departure time) in a terminal building of an airport.

However, there is a case where a traveler who has passed the security check does not appear at a boarding gate by a predetermined boarding time. In this case, an airline company searches for a non-boarded traveler (hereinafter, referred as a non-boarded passenger), and guide the traveler to the boarding gate.

However, it is time consuming to find the non-boarded passenger in a terminal building. Therefore, for example, as described in NPL 1, there arises a situation where many travelers miss an aircraft.

Accordingly, a system for searching for the non-boarded passenger is under development. For example, in the non-boarded passenger search system disclosed in PTL 1, an identification number of a passenger entering a boarding lobby is acquired using a passenger reception terminal of the security check. Moreover, when the identification number is acquired using the passenger reception terminal, a passenger entering a boarding lobby is photographed by a surveillance camera placed near the passenger reception terminal. The passenger entering the boarding lobby is photographed by a plurality of other surveillance cameras. An identification number of the passenger arriving at the boarding lobby by a scheduled time is acquired using the boarding gate terminal. Consequently, a passenger (non-boarded passenger) who has not arrived at the boarding gate even after a scheduled time is identified. Further, in the system of PTL 1, an area is identified where a person estimated to be a non-boarded passenger is photographed, based on the image photographed when the person enters the boarding lobby, and the image photographed in the boarding lobby.

PTL 1 describes that a search for a non-boarded passenger who has not been on board even though a departure time is approaching can be made efficient by the configuration as described above.

CITATION LIST

Patent Literature

[PTL 1] Japanese Patent No. 5851651
[PTL 2] Japanese Unexamined Patent Application Publication No. 2007-058763

Non Patent Literature

[NPL 1] "ITmedia, Business Online, Wednesday Interview Theater, What kind of person gets on a plane last? Analyzing Haneda Airport", [online], [searched on Oct. 6, 2016], Internet <http://www.itmedia.co.jp/business/articles/1605/11/news013_5.html>

SUMMARY OF INVENTION

Technical Problem

In the non-boarded passenger search system of PTL 1, when acquiring an identification number of a passenger entering the boarding lobby, an image (hereinafter, referred to as an image for registration) for identifying the passenger is photographed and registered. In other words, in the non-boarded passenger search system of PTL 1, an opportunity for photographing the image for registration is limited to a time when the identification number of the passenger is acquired.

Thus, there is a concern that an image for registration may not be suitably photographed in a case where a passenger is looking down or a walking speed of a passenger is fast when the identification number of the passenger is acquired.

On the other hand, in the non-boarded passenger search system of PTL 1, a suitable image for registration can be photographed by causing the passenger to look toward a photographing device or walk slowly when an image for registration is captured. However, this causes the passenger to be aware of being photographed the image for registration, and may make the passenger feel uncomfortable. In addition, it becomes difficult for the passenger to smoothly enter the boarding lobby.

One example of an object of the present invention is to provide a non-boarded passenger search device, a non-boarded passenger search method, and the like being capable of efficiently searching for a non-boarded passenger in a terminal building of an airport.

Solution to Problem

To achieve the above purpose, a non-boarded passenger search device which searches for a non-boarded passenger in a terminal building of an airport according to one aspect of the present invention is provided. The device includes:

image registration means for registering image data of faces of a plurality of scheduled passengers photographed before a predetermined passage point on a path toward a boarding gate;

determination means for, each time a face of a scheduled passenger is photographed at the passage point, comparing image data of the face with the image data of faces of the plurality of scheduled passengers registered by the image registration means, and then determining whether a scheduled passenger whose face is photographed at the passage point is present in a plurality of scheduled passengers whose the image data of faces are registered by the image registration means;

flight number registration means for, when the determination means determines that the scheduled passenger whose face is photographed at the passage point is present in the plurality of scheduled passengers whose the image data of faces are registered by the image registration means, registering a flight number which the scheduled passenger is scheduled to board, in association with image data of the face of the scheduled passenger; and presentation means for presenting position information of a scheduled passenger between the passage point and the boarding gate for each of the flight numbers, based on the image data of the face of the scheduled passenger and the flight number associated by the flight number registration means, the image data of the face of the scheduled passenger photographed at the plurality of photographing points between the passage point and the boarding gate, and position information of the plurality of preset photographing points.

To achieve the above purpose, a non-boarded passenger search method of searching for a non-boarded passenger in a terminal building of an airport according to one aspect of the present invention is provided. The method includes:

registering image data of faces of a plurality of scheduled passengers photographed before a predetermined passage point on a path toward a boarding gate;

each time a face of a scheduled passenger is photographed at the passage point, comparing image data of the face with registered image data of faces of the plurality of scheduled passengers, and then determining whether a scheduled passenger whose face is photographed at the passage point is present in the plurality of registered scheduled passengers;

when the scheduled passenger whose face is photographed at the passage point is present in the plurality of registered scheduled passengers, registering a flight number which the scheduled passenger is scheduled to board, in association with image data of the face of the scheduled passenger; and presenting position information of a scheduled passenger between the passage point and the boarding gate for each of the flight numbers, based on the image data of the face of the scheduled passenger and the flight number associated, the image data of the face of the scheduled passenger photographed at the plurality of photographing points between the passage point and the boarding gate, and position information of the plurality of preset photographing points.

To achieve the above purpose, a recording medium storing a program which causes a computer to search for a non-boarded passenger in a terminal building of an airport according to one aspect of the present invention is provided.

The program causes the computer to execute:

registering image data of faces of a plurality of scheduled passengers photographed before a predetermined passage point on a path toward a boarding gate;

each time a face of a scheduled passenger is photographed at the passage point, comparing image data of the face with registered image data of faces of the plurality of scheduled passengers, and then determining whether a scheduled passenger whose face is photographed at the passage point is present in the plurality of registered scheduled passengers;

when a scheduled passenger whose face is photographed at the passage point is present in the plurality of registered scheduled passengers, registering a flight number which the scheduled passenger is scheduled to board, in association with image data of the face of the scheduled passenger; and presenting position information of a scheduled passenger between the passage point and the boarding gate for each of the flight numbers, based on the image data of the face of the scheduled passenger and the flight number associated, the image data of the face of the scheduled passenger photographed at the plurality of photographing points between the passage point and the boarding gate, and position information of the plurality of preset photographing points.

Advantageous Effects of Invention

According to one aspect of the present invention, it is possible to efficiently search for a non-boarded passenger in a terminal building of an airport.

BRIEF DESCRIPTION OF DRAWINGS

FIG. 2 is a block diagram illustrating a specific configuration of a search device in an example embodiment.

FIG. 3 is a diagram illustrating one example of position information displayed on a display screen of a terminal device.

EXAMPLE EMBODIMENT

Example Embodiment

Hereinafter, a non-boarded passenger search device, a non-boarded passenger search method, and a program in an example embodiment will be described with reference to FIG. 1A, FIG. 1B, and FIGS. 2 to 5.

[Device Configuration]

Figure 1A:
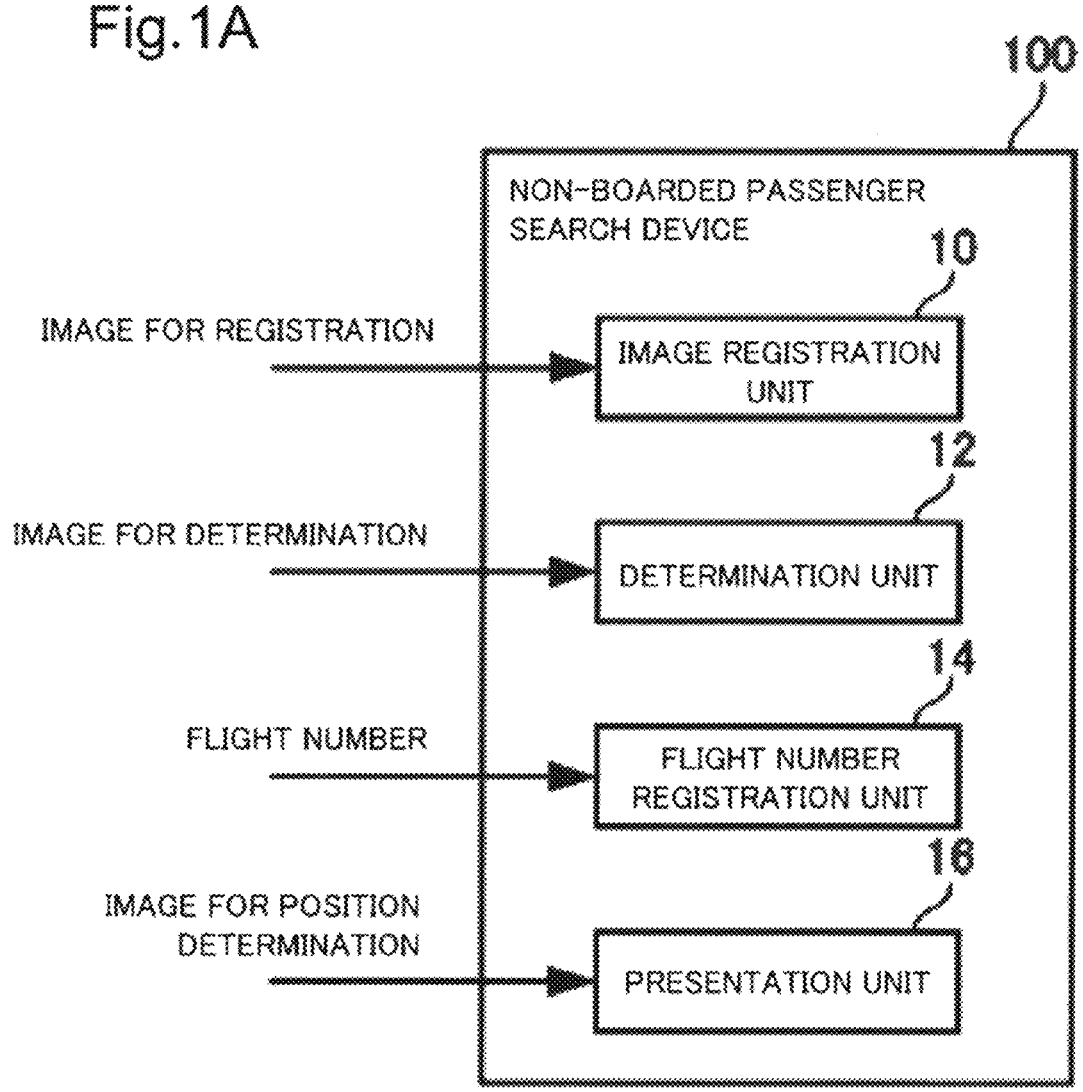
FIG. 1A is a block diagram illustrating a schematic configuration of a search device in an example embodiment.

First, a schematic configuration of a non-boarded passenger search device (hereinafter, also referred to merely as a search device) in an example embodiment is described by use of FIG. 1A. FIG. 1A is a block diagram illustrating a schematic configuration of a search device in an example embodiment.

Figure 1B:
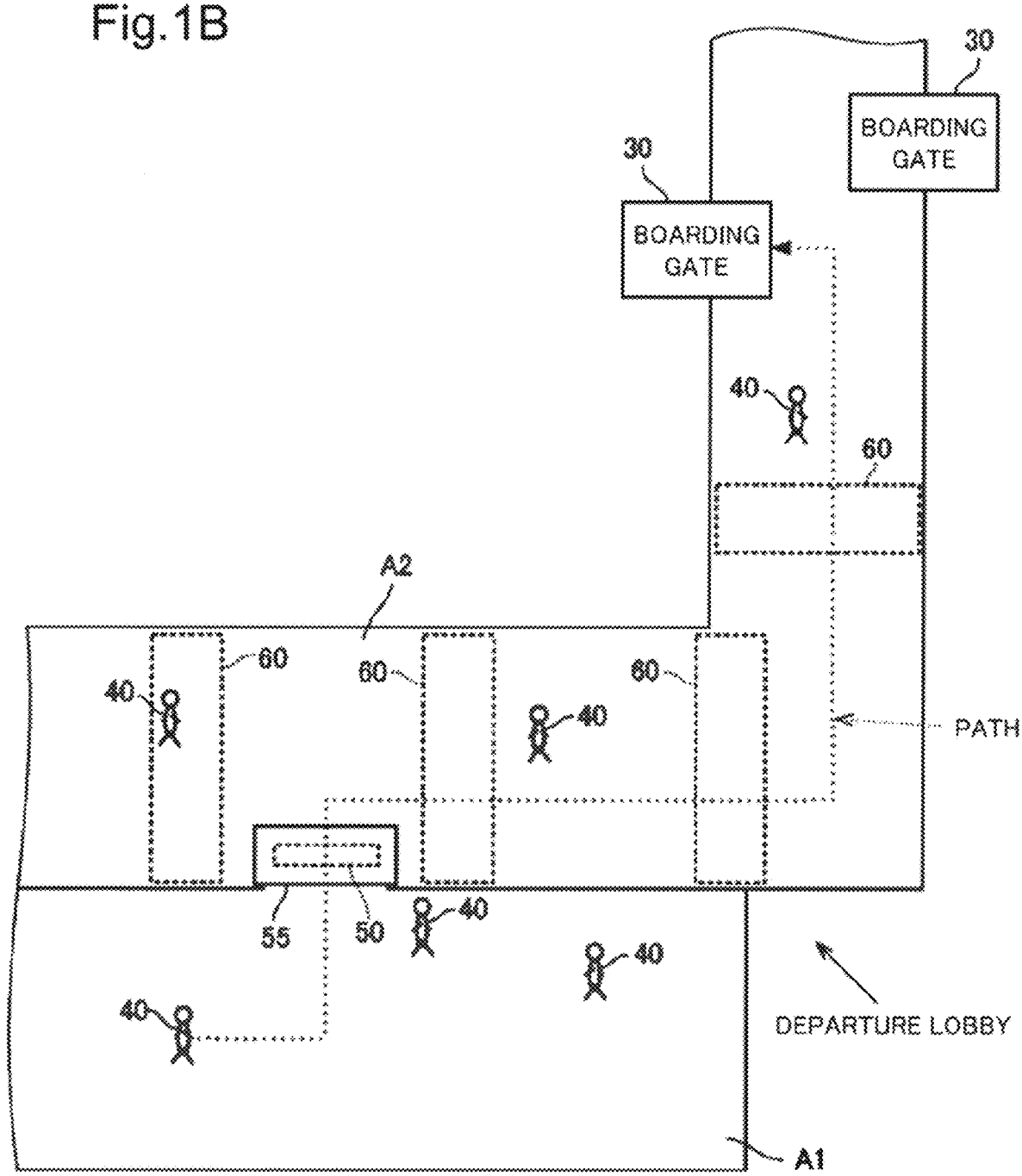
FIG. 1B is a diagram illustrating one example of a departure lobby of a terminal building of an airport where a search device in an example embodiment is utilized.

FIG. 1B is a diagram illustrating one example of a departure lobby of a terminal building of an airport where the search device is utilized. The departure lobby illustrated in FIG. 1B includes a first area A1 and a second area A2. A plurality of boarding gates 30 are provided in the second area A2. Moreover, a plurality of scheduled passengers 40 are illustrated in FIG. 1B.

In the example illustrated in FIG. 1B, a scheduled passenger 40 can move from the first area A1 to the second area A2 through a passage point 50. In other words, the passage point 50 is located on a movement path of a scheduled passenger 40 traveling toward the boarding gate 30 from the first area A1 to the second area A2. In the example of FIG. 1B, the passage point 50 is located in a security check 55. In FIG. 1B, one example of a movement path of a scheduled passenger 40 traveling toward the boarding gate 30 from the first area A1 through the passage point 50 is illustrated with a dotted line.

As illustrated in FIG. 1A, a search device 100 in the present example embodiment includes an image registration unit 10, a determination unit 12, a flight number registration unit 14, and a presentation unit 16. The search device 100 is a device which searches for a non-boarded passenger in a terminal building of an airport.

Data of an image (hereinafter, referred to as an image for registration) of a face of each of a plurality of scheduled passengers 40 photographed at a position before the passage point 50 on a path where a plurality of scheduled passengers 40 travel toward the boarding gate 30 are input to the image registration unit 10. In the present example embodiment, for example, a photographing device for registration may be disposed in the first area A1, and images for registration of a plurality of scheduled passengers 40 may be captured by the photographing device for registration. Moreover, for example, the photographing device for registration may be provided in such a way as to photograph a scheduled passenger 40 moving toward the passage point 50 in the security check 55. Specifically, the photographing device for registration may be provided in such a way as to photograph a face of a scheduled passenger 40 walking through in the security check 55. The photographing device for registration transmits data of the photographed image for registration (hereinafter, referred to as image data for registration) of a scheduled passenger 40 to the image registration unit 10.

Data of an image (hereinafter, referred to as an image for determination) of a face of a scheduled passenger 40 photographed at the passage point 50 are input to the determination unit 12. In the present example embodiment, for example, a photographing device for determination is placed near the passage point 50, and an image for determination of a scheduled passenger 40 is captured by the photographing device for determination. Moreover, for example, when a security gate (not illustrated) of the security check 55 is set at the passage point 50, a photographing device for determination may be provided at the security gate. The photographing device for determination transmits data of the photographed image for determination (hereinafter, referred to as image data for determination) of a scheduled passenger 40 to the determination unit 12.

Each time an image for determination of a scheduled passenger 40 is captured at the passage point 50, the determination unit 12 compares the image data for determination with image data for registration of a plurality of scheduled passengers 40 registered by the image registration unit 10. Then, the determination unit 12 determines whether a scheduled passenger 40 whose image for determination is captured at the passage point 50 is present in a plurality of scheduled passengers 40 whose image data for registration are registered by the image registration unit 10.

A flight number scheduled for boarding of a scheduled passenger 40 passing the passage point 50 is input to the flight number registration unit 14. In the present example embodiment, for example, an input device is placed near the passage point 50, and a flight number scheduled for boarding is input by a scheduled passenger 40 by use of the input device. The input device transmits, to the flight number registration unit 14, the flight number input by a scheduled passenger 40. Note that, in the present example embodiment, for example, a plurality of flight numbers may be displayed on the input device, and a flight number selected from among the plurality of displayed flight numbers by a scheduled passenger 40 may be input to the flight number registration unit 14. Moreover, a flight number read by the input device from a recording medium recording information including a flight number scheduled for boarding of a scheduled passenger 40 may be input to the flight number registration unit 14. Note that the above-described photographing device for determination may be provided in the input device, for example.

When the determination unit 12 determines that a scheduled passenger 40 whose image for determination is captured at the passage point 50 is present in a plurality of scheduled passengers 40 whose image data for registration are registered by the image registration unit 10, the flight number registration unit 14 registers a flight number scheduled for boarding of the scheduled passenger 40 in association with image data (in the present example embodiment, image data for registration) of a face of the scheduled passenger 40.

Data of an image (hereinafter, referred to as an image for position determination) of a face of a scheduled passenger 40 captured at a plurality of photographing points 60 between the passage point 50 and the boarding gate 30 are input to the presentation unit 16. In the present example embodiment, a photographing device for position determination is placed for each photographing point 60, and an image for position determination of a scheduled passenger 40 at the photographing point 60 is captured by the photographing device for position determination. The photographing device for position determination transmits, to the presentation unit 16, data of the photographed image for position determination (hereinafter, referred to as image data for position determination) of the scheduled passenger 40.

The presentation unit 16 presents position information of a scheduled passenger 40 between the passage point 50 and the boarding gate 30 for each flight number, based on image data (in the present example embodiment, image data for registration) of a face of a scheduled passenger 40 and a flight number associated with each other by the flight number registration unit 14, image data for position determination of a scheduled passenger 40 captured at a plurality of photographing points 60, and position information of a plurality of preset photographing points 60.

In this way, in the search device 100 according to the present example embodiment, a plurality of images for registration previously photographed before a scheduled passenger 40 passes the passage point 50 are collated with an image for determination captured at the passage point 50. Then, when an image for determination is an image corresponding to any one of images for registration, data of the image (in the present example embodiment, image data for registration) and a flight number scheduled for boarding of a scheduled passenger 40 corresponding to the image data are registered in association with each other. Then, position information of a scheduled passenger 40 is presented for each flight number, based on image data of a scheduled passenger 40 and a flight number associated with each other, image data for position determination of a scheduled passenger 40 captured at a photographing point 60, and position information of a photographing point 60. Thus, based on position information of a scheduled passenger 40 presented by the search device 100, a worker of an airline company can easily recognize a position of a scheduled passenger 40 who has not appeared at the boarding gate 30 even at a predetermined time.

Furthermore, as described above, in the present example embodiment, an image for registration is captured before the passage point 50. Thus, as compared with a case where an image for registration is captured when passing the passage point 50, many opportunities for photographing an image for registration can be ensured. Consequently, a suitable image for registration can be efficiently captured.

Still further, since it is not necessary to cause a scheduled passenger 40 to look toward a photographing device or walk slowly in order to capture an image for registration, the scheduled passenger 40 can smoothly pass the passage point 50. Moreover, it is possible not to make a scheduled passenger 40 aware of being captured an image for registration. Further, in the present example embodiment, since it is possible to search for a non-boarded passenger by associating an image data of a face of a scheduled passenger 40 with a flight number scheduled for boarding, it is not necessary to register detailed personal information of a scheduled passenger 40. As a result, it is possible to prevent a scheduled passenger 40 from being made uncomfortable.

Consequently, by the search device 100 according to the present example embodiment, it is possible to efficiently search for a non-boarded passenger in a terminal building of an airport.

Now, a configuration and a function of a search device in an example embodiment are more specifically described by use of FIG. 2. A block diagram illustrating a specific configuration of a search device in an example embodiment is illustrated in FIG. 2. Further, a non-boarded passenger search system including a search device in an example embodiment is illustrated in FIG. 2.

As illustrated in FIG. 2, a non-boarded passenger search system 1000 includes a search device 100, a photographing device for registration 20, a photographing device for determination 22, an input device 24, a plurality of photographing devices for position determination 26, a plurality of photographing devices for boarding confirmation 28, and a terminal device 70. Note that, although detailed description is omitted, the photographing device 20, the photographing device 22, the input device 24, the plurality of photographing devices 26, the plurality of photographing devices 28, and the terminal device 70 are connected to the search device 100 via a wired or wireless network.

As illustrated in FIGS. 1A, 1B, and 2, the photographing device 20 photographs images for registration of a plurality of scheduled passengers 40 at a position before the passage point 50. The photographing device 20 transmits, to the image registration unit 10, image data for registration acquired by capturing a scheduled passenger 40. In the present example embodiment, the photographing device 20 may be placed in the first area A1 or the security check 55, for example. When placed in the security check 55, the photographing device 20 may be provided in such a way as to photograph a face of a scheduled passenger 40 walking through in the security check 55, for example. Note that, although only one photographing device 20 is illustrated in FIG. 2, a plurality of photographing devices 20 may be provided.

The photographing device 22 captures an image for determination of a scheduled passenger 40 passing the passage point 50. The photographing device 22 transmits, to the determination unit 12, image data for determination acquired by photographing a scheduled passenger 40. In the present example embodiment, the photographing device 22 is placed near the passage point 50. Specifically, for example, when a security gate (not illustrated) of the security check 55 is set at the passage point 50, the photographing device 22 may be provided at the security gate. In this case, the photographing device 22 may capture an image for determination when a scheduled passenger 40 passes the security gate.

A flight number scheduled for boarding of a scheduled passenger 40 passing the passage point 50 is input to the input device 24. The input device 24 transmits the input flight number to the flight number registration unit 14. For example, a personal computer, a tablet type terminal, and the like can be used as the input device 24. The input device 24 is provided near the passage point 50. In the present example embodiment, for example, a plurality of flight numbers may be displayed on the input device 24, and a flight number selected from among the plurality of displayed flight numbers by a scheduled passenger 40 may be transmitted to the flight number registration unit 14. In this case, the input device 24 may display a plurality of flight numbers acquired from a FIS (flight information service), for example. Note that the input device 24 may transmit, to the flight number registration unit 14, a flight number read from a recording medium recording information including a flight number scheduled for boarding of a scheduled passenger 40.

Note that, in the present example embodiment, the photographing device 22 may be provided in the input device 24. In this case, the photographing device 22 may be configured in such a way as to capture an image for determination of a scheduled passenger 40 when a flight number scheduled for boarding of a scheduled passenger 40 is input to the input device 24.

The plurality of photographing devices 26 capture an image for position determination of a scheduled passenger 40 at the plurality of photographing points 60 between the passage point 50 and the boarding gate 30. The plurality of photographing devices 26 transmit, to the presentation unit 16, image data for position determination acquired by capturing a scheduled passenger 40. In the present example embodiment, the photographing device 26 is provided for each photographing point 60. Note that, although the plurality of photographing points 60 are set with spaces between one another in the example of FIG. 1B, the plurality of photographing points 60 may be set continuously.

As illustrated in FIGS. 1A, 1B, and 2, the plurality of photographing devices 28 capture images (hereinafter, referred to as images for confirmation) of faces of scheduled passengers 40 located around the plurality of boarding gates 30. The plurality of photographing devices 28 transmit data of captured images for confirmation (hereinafter, referred to as image data for confirmation) to the presentation unit 16. In the present example embodiment, the photographing device 28 is provided for each boarding gate 30.

The terminal device 70 is used by a worker of an airline company, for example. For example, a personal computer, a smartphone, a tablet type terminal, and the like can be used as the terminal device 70. In the present example embodiment, for example, a worker of an airline company transmits, to the presentation unit 16, a flight number to search for a non-boarded passenger, by utilizing the terminal device 70.

In the present example embodiment, the search device 100 further includes a storage unit 18 in addition to the image registration unit 10, the determination unit 12, the flight number registration unit 14, and the presentation unit 16 described above.

The image registration unit 10 registers, in the storage unit 18, image data for registration of a plurality of scheduled passengers 40 input from the photographing device 20. Although detailed description is omitted, the image registration unit 10 stores image data for registration in the storage unit 18, for example, by attaching temporary identification information to each piece of image data for registration, in the present example embodiment.

Each time image data for determination are input from the photographing device 22, the determination unit 12 compares the image data for determination with image data for registration of a plurality of scheduled passengers 40 registered in the storage unit 18 by the image registration unit 10. Then, the determination unit 12 determines whether a scheduled passenger 40 whose image for determination is captured at the passage point 50 is present in a plurality of scheduled passengers 40 whose image data for registration are registered in the storage unit 18, and transmits a determination result to the flight number registration unit 14.

When the determination unit 12 determines that a scheduled passenger 40 whose image for determination is captured at the passage point 50 is present in a plurality of scheduled passengers 40 whose image data for registration are registered in the storage unit 18, the flight number registration unit 14 registers, in the storage unit 18, the image data for registration of the scheduled passenger 40 in association with a flight number input from the input device 24.

On the other hand, when the determination unit 12 determines that a scheduled passenger 40 whose image for determination is captured at the passage point 50 is not present in a plurality of scheduled passengers 40 whose image data for registration are registered in the storage unit 18, the determination unit 12 transmits, to the flight number registration unit 14, image data for determination input from the photographing device 22. The flight number registration unit 14 registers, in the storage unit 18, the image data for determination input from the determination unit 12 in association with a flight number input from the input device 24. Note that the flight number registration unit 14 may directly acquire image data for determination from the photographing device 22.

Note that, in the present example embodiment, the flight number registration unit 14 acquires, from, for example, a flight information service (FIS), information on a boarding gate of a flight scheduled for boarding of a scheduled passenger 40, based on a flight number input from the input device 24. Then, the flight number registration unit 14 registers, in the storage unit 18, the boarding gate 30 (more specifically, identification information of the boarding gate 30) of a flight scheduled for boarding of a scheduled passenger 40, in association with image data (image data for registration or image data for determination) of a face of the scheduled passenger 40.

The presentation unit 16 presents position information of a scheduled passenger 40 between the passage point 50 and the boarding gate 30 for each flight number, based on image data of a face of a scheduled passenger 40 and a flight number associated with each other by the flight number registration unit 14, image data for position determination of a scheduled passenger 40 input from the plurality of photographing devices 26, and position information of the plurality of preset photographing points 60.

Specifically, for example, when image data for position determination are input, the presentation unit 16 selects image data corresponding to the image data for position determination from among image data (image data for registration or image data for determination) of faces of the scheduled passengers 40 stored in the storage unit 18. Then, the presentation unit 16 reads a flight number associated with the selected image data from the storage unit 18. Thus, the presentation unit 16 can identify a flight number scheduled for boarding of a scheduled passenger 40 whose image for position determination is captured. As a result, the presentation unit 16 can present, for each flight number, position information of a scheduled passenger 40 whose image for position determination is captured.

Note that, in the present example embodiment, when an image for confirmation of a scheduled passenger 40 is captured at any boarding gate 30, the presentation unit 16 determines whether the boarding gate 30 coincides with a boarding gate 30 registered in the storage unit 18 by the flight number registration unit 14 in association with image data of the scheduled passenger 40. Then, when determining that the boarding gate 30 coincides, the presentation unit 16 excludes position information of the scheduled passenger 40, and then presents position information of another scheduled passenger 40.

Note that, although detailed description is omitted, the presentation unit 16 may present position information of a scheduled passenger 40, excluding only a scheduled passenger 40 whose image data for confirmation are captured by the photographing device 28 between a predetermined time before (e.g., 5 minutes before) a boarding time and the boarding time, for example. In this case, it is possible to prevent exclusion of position information of a scheduled passenger 40 who has been near the boarding gate 30 well before a boarding time but has moved away from a periphery of the boarding gate 30 immediately before the boarding time.

Furthermore, in the present example embodiment, when a face of a given scheduled passenger 40 is photographed at the plurality of photographing points 60, the presentation unit 16 registers, in the storage unit 18, a photographing time for each photographing point 60 in association with image data (image data for registration or image data for determination) of a face of the scheduled passenger 40. Then, based on the registered photographing time for each photographing point 60 and position information of the plurality of preset photographing points 60, the presentation unit 16 presents a movement path of a scheduled passenger 40 as position information of the scheduled passenger 40. Note that position information of a photographing point 60 may be stored in the storage unit 18, or supplied to the presentation unit 16 from the photographing device 26, for example.

Note that, in the present example embodiment, according to a flight number input from the terminal device 70, the presentation unit 16 transmits position information of a scheduled passenger 40 of the flight number to the terminal device 70. Thus, position information of a scheduled passenger 40 is presented on a display screen of the terminal device 70.

FIG. 3 is a diagram illustrating one example of position information displayed on the display screen of the terminal device 70. In the example illustrated in FIG. 3, positions of a scheduled passenger 40a and a scheduled passenger 40b for each of photographing time are indicated by circles, and movement paths are indicated by arrows. In the example illustrated in FIG. 3, a worker of an airline company can recognize current positions of the scheduled passengers 40a and 40b, based on position information presented on the display screen of the terminal device 70. Further, a worker of an airline company can recognize that the scheduled passenger 40a is moving in a direction of departing from the boarding gate 30, and the scheduled passenger 40b is moving in a direction of approaching the boarding gate 30.

Note that the example illustrated in FIG. 3 is one example of a presentation aspect of position information, and a presentation aspect of position information is not limited to the example illustrated in FIG. 3. For example, a photographing time may be presented together with a position of a scheduled passenger 40. Moreover, for example, a position of a scheduled passenger 40 photographed at a time closest to a current time may be displayed in a flashing manner.

[Device Operation]

Figure 4:
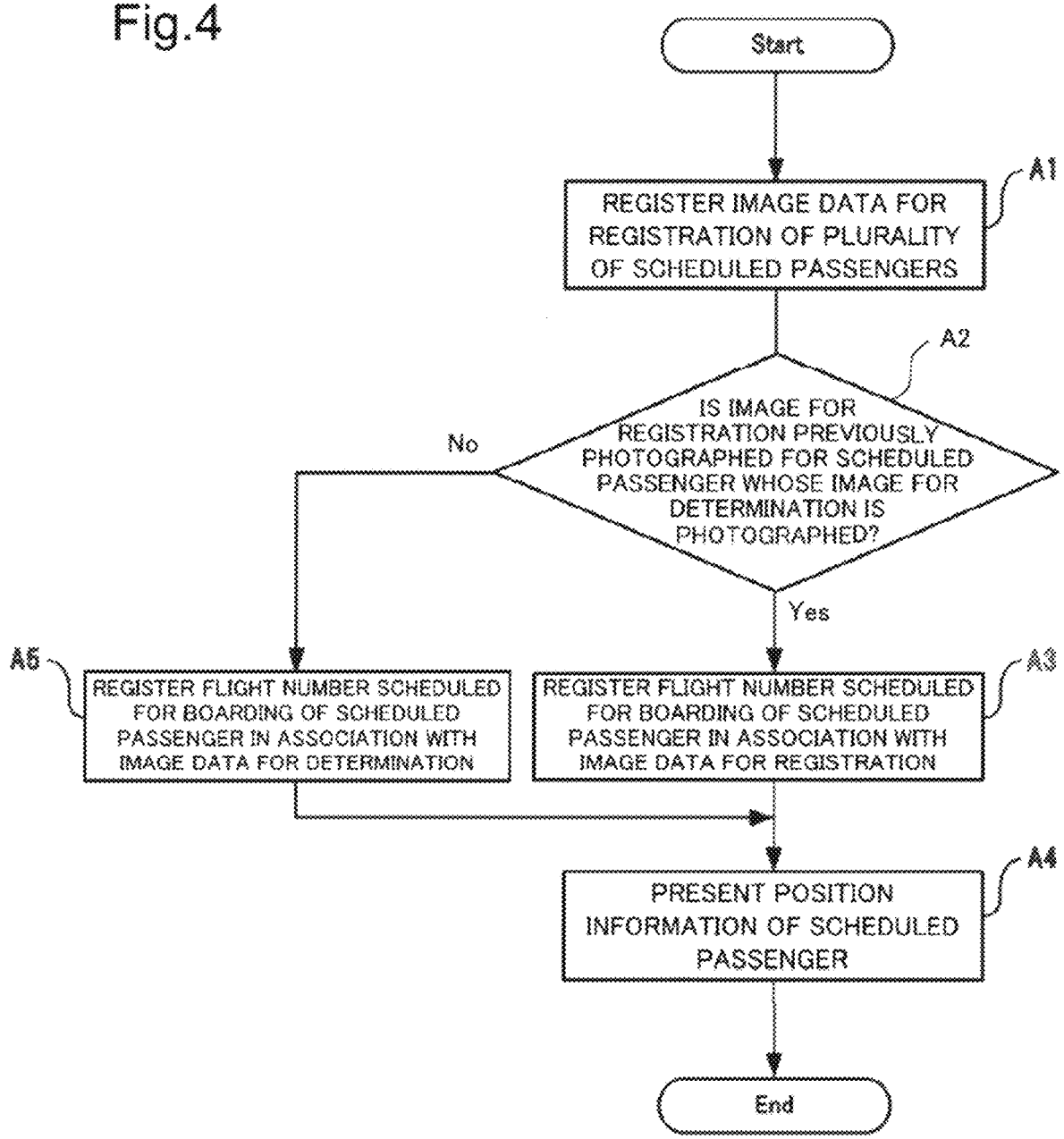
FIG. 4 is a flowchart illustrating an operation of a search device in an example embodiment.

Next, an operation of a non-boarded passenger search device in an example embodiment is described by use of FIG. 4. FIG. 4 is a flowchart illustrating an operation of a non-boarded passenger search device in an example embodiment. In the following description, FIGS. 1A, 1B, 2, and 3 are appropriately incorporated by reference. Moreover, in the present example embodiment, a non-boarded passenger search method is conducted by operating the search device 100. Thus, a description of the non-boarded passenger search method in the present example embodiment is replaced by the following operation description of the search device 100.

As illustrated in FIG. 4, in the search device 100, the image registration unit 10 first registers image data for registration of a plurality of scheduled passengers 40 in the storage unit 18 (step A1).

Then, when an image for determination is input, the determination unit 12 determines whether a scheduled passenger 40 whose image for determination is captured at the passage point 50 is present in a plurality of scheduled passengers 40 for whose image data for registration are registered (step A2). In other words, in the step A2, the determination unit 12 determines whether an image for registration of a scheduled passenger 40 whose image for determination is captured is previously captured.

When the determination unit 12 determines in the step A2 that an image for registration of a scheduled passenger 40 whose image for determination is captured is previously captured, the flight number registration unit 14 registers, in the storage unit 18, a flight number which the scheduled passenger 40 is scheduled to board, in association with image data for registration of the scheduled passenger 40 (step A3).

Note that, in the present example embodiment, in the step A3, the flight number registration unit 14 further acquires, from a FIS (flight information service), information on a boarding gate of a flight scheduled for boarding of a scheduled passenger 40, based on a flight number input from the input device 24. Then, the flight number registration unit 14 registers, in the storage unit 18, the boarding gate 30 (more specifically, identification information of the boarding gate 30) of a flight scheduled for boarding of a scheduled passenger 40, in association with image data for registration of the scheduled passenger 40.

Then, the presentation unit 16 presents position information of a scheduled passenger 40 between the passage point 50 and the boarding gate 30 for each flight number, based on image data of a face of a scheduled passenger 40 and a flight number associated with each other by the flight number registration unit 14, image data for position determination of a scheduled passenger 40, and position information of the plurality of photographing points 60 (step A4). Note that, in the step A4, according to a flight number input from the terminal device 70, the presentation unit 16 transmits position information of a scheduled passenger 40 of the flight number to the terminal device 70.

Furthermore, in the present example embodiment, in the step A4, when image data for confirmation of a scheduled passenger 40 are input from the photographing device 28 of a given boarding gate 30, the presentation unit 16 further determines whether the boarding gate 30 coincides with a boarding gate 30 associated with image data of a face of the scheduled passenger 40 by the flight number registration unit 14. Then, when determining that the boarding gate 30 coincides, the presentation unit 16 excludes position information of the scheduled passenger 40, and then presents position information of another scheduled passenger 40.

Furthermore, in the present example embodiment, in the step A4, the presentation unit 16 presents a movement path of the scheduled passenger 40 as position information of the scheduled passenger 40 based on a photographing time of a scheduled passenger 40 for each photographing point 60 and position information of the photographing point 60.

When, in the step A2, the determination unit 12 determines that an image for registration of a scheduled passenger 40 is not previously photographed, the flight number registration unit 14 registers, in the storage unit 18, a flight number which the scheduled passenger 40 is scheduled to board, in association with image data for determination of the scheduled passenger 40 (step A5). Thereafter, the operation proceeds to processing in the step A4.

Note that, in the present example embodiment, in the step A5, based on a flight number input from the input device 24, the flight number registration unit 14 further acquires, from a FIS (flight information service), information on a boarding gate of a flight scheduled for boarding of a scheduled passenger 40. Then, the flight number registration unit 14 registers, in the storage unit 18, the boarding gate 30 (more specifically, identification information of the boarding gate 30) of a flight scheduled for boarding of a scheduled passenger 40, in association with image data for determination of the scheduled passenger 40.

Advantageous Effect in Example Embodiment

As described above, in the present example embodiment, based on position information of a scheduled passenger 40 presented by the search device 100, a worker of an airline company can easily recognize a position of a scheduled passenger 40 who has not appeared at the boarding gate 30 even at a predetermined time. Moreover, an image for registration is captured before the passage point 50, and therefore, more opportunities for photographing an image for registration can be ensured as compared with a case where an image for registration is captured when passing the passage point 50. Consequently, a suitable image for registration can be efficiently captured.

Furthermore, it is not necessary to cause a scheduled passenger 40 to look toward a photographing device 20 or walk slowly in order to capture an image for registration, and moreover, it is possible not to make a scheduled passenger 40 aware of being captured an image for registration. Further, it is not necessary to register detailed personal information of a scheduled passenger 40.

Furthermore, in the present example embodiment, the presentation unit 16 excludes position information of a scheduled passenger 40 whose image for confirmation is captured by the photographing device 28, and then presents position information of another scheduled passenger 40. Consequently, a worker of an airline company can efficiently search for a non-boarded passenger.

Furthermore, in the present example embodiment, in the above-described step A2, there is a case where the determination unit 12 determines that a scheduled passenger 40 whose image for determination is captured at the passage point 50 is not present in a plurality of scheduled passengers 40 whose image data for registration are registered. In this case, instead of image data for registration, image data for determination are registered in association with a flight number scheduled for boarding of a scheduled passenger 40. Thus, even when a suitable image for registration cannot be captured before the passage point 50, position information of a scheduled passenger 40 can be acquired based on image data for determination Consequently, by the search device 100 according to the present example embodiment, it is possible to efficiently search for a non-boarded passenger.

Modification Example

Although a case where a presentation unit transmits position information of a scheduled passenger to a terminal device is described in the above-described example embodiment, a presentation method of a scheduled passenger is not limited to the above-described example. For example, a presentation unit may display position information of a scheduled passenger on a display device provided in a search device, and also, position information of a scheduled passenger may be displayed on a display device placed in a terminal building.

Furthermore, based on a distance between a boarding gate and a scheduled passenger, and a time until a boarding time, a presentation unit may automatically notify (push-notify) another device such as a terminal device of position information of a scheduled passenger. Moreover, when a number of scheduled passengers (non-boarded passengers) whose images for confirmation are not captured at a boarding gate becomes less than or equal to a predetermined number (e.g., less than or equal to 5), a presentation unit may automatically notify another device of position information of a non-boarded passenger.

Still further, a photographing device for boarding confirmation may captured, as an image for confirmation, an image of a face of a scheduled passenger who has passed a boarding gate.

[Program]

A program in an example embodiment only has to be a program which causes a computer to execute the steps A1 to A5 illustrated in FIG. 4. It is possible to implement a non-boarded passenger search device and a non-boarded passenger search method in the present example embodiment by installing the program on a computer and executing the program. In this case, a CPU (central processing unit) of a computer serving as a non-boarded passenger search device functions as the image registration unit 10, the determination unit 12, the flight number registration unit 14, and the presentation unit 16, and performs processing.

Furthermore, a program in the present example embodiment may be executed by a computer system constructed by a plurality of computers. In this case, for example, each computer may function as one of the image registration unit 10, the determination unit 12, the flight number registration unit 14, and the presentation unit 16. Moreover, the storage unit 18 may be constructed on a computer being different from a computer which executes a program in the present example embodiment.

[Physical Configuration]

Figure 5:
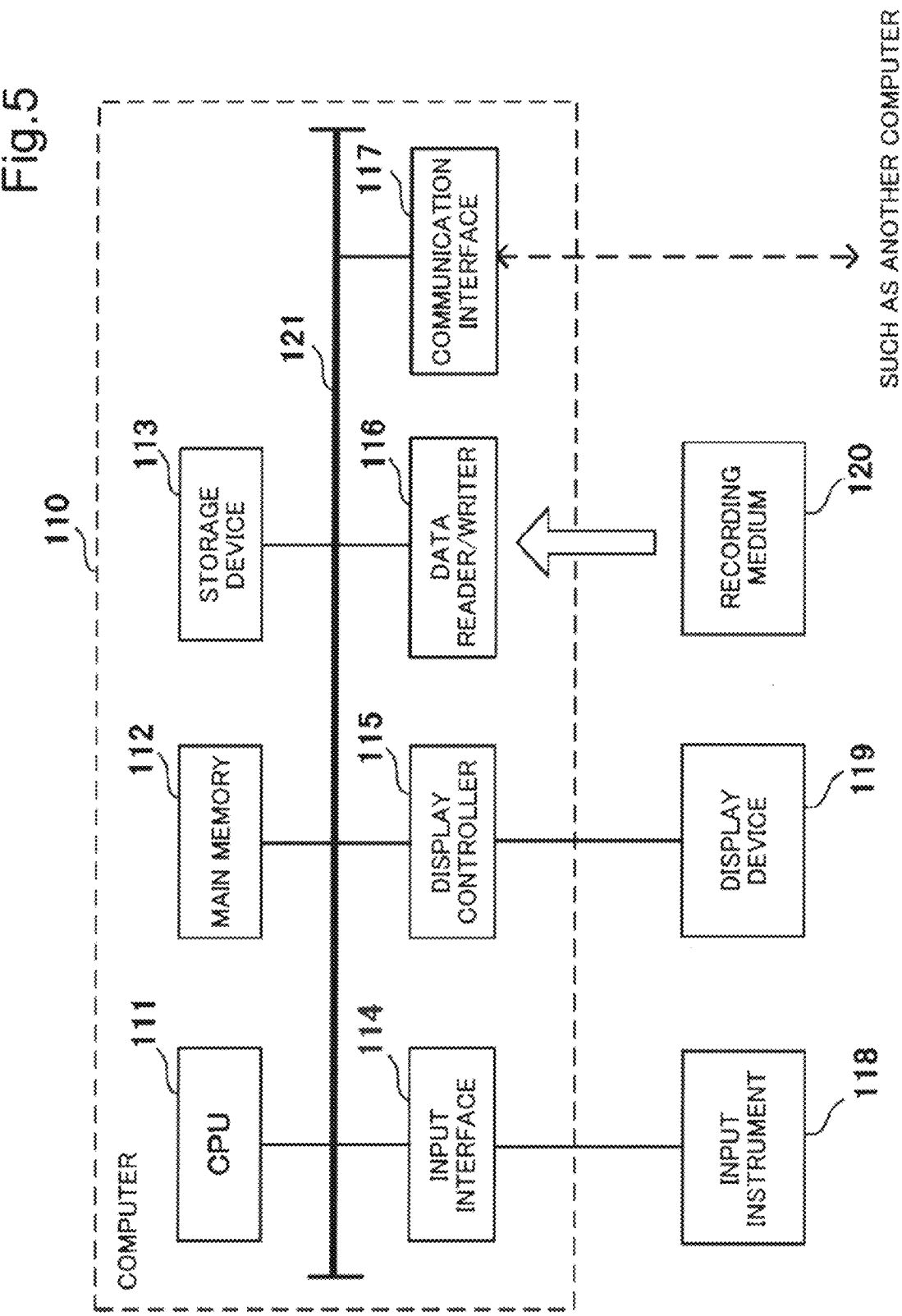
FIG. 5 is a block diagram illustrating one example of a computer which implements a search device in an example embodiment.

Herein, a computer which implements a non-boarded passenger search device by executing a program in the present example embodiment is described by use of a drawing. FIG. 5 is a block diagram illustrating one example of a computer which implements a non-boarded passenger search device in an example embodiment.

As illustrated in FIG. 5, a computer 110 includes a CPU 111, a main memory 112, a storage device 113, an input interface 114, a display controller 115, a data reader/writer 116, and a communication interface 117. The respective components are data-communicably connected to one another via a bus 121.

The CPU 111 conducts various calculations by expanding, in the main memory 112, programs (codes) in the present example embodiment stored in the storage device 113, and executing the programs (codes) in a predetermined order. The main memory 112 is typically a volatile storage device such as a dynamic random access memory (DRAM). Moreover, a program in the present example embodiment is provided in a state of being stored in a computer-readable recording medium 120. Note that a program in the present example embodiment may be distributed on the Internet connected via the communication interface 117.

Furthermore, as a specific example of the storage device 113, a semiconductor storage device such as a flash memory is cited in addition to a hard disk drive. The input interface 114 mediates data transmission between the CPU 111 and an input instrument 118 such as a keyboard and a mouse. The display controller 115 is connected to a display device 119, and controls display on the display device 119.

The data reader/writer 116 mediates data transmission between the CPU 111 and the recording medium 120, reads a program from the recording medium 120, and executes writing of a processing result in the computer 110 into the recording medium 120. The communication interface 117 mediates data transmission between the CPU 111 and another computer.

Furthermore, as a specific example of the recording medium 120, a general-purpose semiconductor storage device such as a CF (compact flash (registered trademark)) and a SD (secure digital), a magnetic storage medium such as a flexible disk, or an optical storage medium such as a CD-ROM (compact disc read only memory) is cited.

Note that a non-boarded passenger search device in the present example embodiment can also be implemented by using hardware corresponding to each component rather than a computer in which a program is installed. Further, a part of a non-boarded passenger search device may be implemented by a program, and a remaining part may be implemented by hardware.

The above-described example embodiment may also be partly or entirely described as, but are not limited to, the following supplementary notes.

Supplementary Note 1

A non-boarded passenger search device which searches for a non-boarded passenger in a terminal building of an airport, the device including:

an image registration unit which registers image data of faces of a plurality of scheduled passengers photographed before a predetermined passage point on a path toward a boarding gate;

a determination unit which, each time a face of a scheduled passenger is photographed at the passage point, compares image data of the face with image data of faces of a plurality of scheduled passengers registered by the image registration unit, and then determines whether a scheduled passenger whose face is photographed at the passage point is present in a plurality of scheduled passengers whose image data of faces are registered by the image registration unit;

a flight number registration unit which, when the determination unit determines that a scheduled passenger whose face is photographed at the passage point is present in a plurality of scheduled passengers whose image data of faces are registered by the image registration unit, registers a flight number which the scheduled passenger is scheduled to board, in association with image data of the face of the scheduled passenger; and a presentation unit which presents position information of a scheduled passenger between the passage point and the boarding gate for each of the flight numbers, based on image data of a face of a scheduled passenger and a flight number associated with each other by the flight number registration unit, image data of a face of a scheduled passenger photographed at a plurality of photographing points between the passage point and the boarding gate, and position information of the plurality of preset photographing points.

Supplementary Note 2

The non-boarded passenger search device according to Supplementary Note 1, wherein, when a face of a given scheduled passenger is photographed at the plurality of photographing points, the presentation unit registers a photographing time for each of the photographing points in association with image data of the face of the given scheduled passenger, and presents a movement path of the given scheduled passenger as the position information of the scheduled passenger, based on a photographing time for each of the registered photographing points and the position information of the plurality of preset photographing points.

Supplementary Note 3

The non-boarded passenger search device according to Supplementary Note 1 or 2, wherein
the passage point is located in a security check.

Supplementary Note 4

The non-boarded passenger search device according to any one of Supplementary Notes 1 to 3, wherein
the flight number registration unit further registers a boarding gate of a flight which a scheduled passenger is scheduled to board, in association with image data of the face, and
in a case where a face of a scheduled passenger is photographed at a given boarding gate, when the boarding gate coincides with a boarding gate associated with image data of the face of the scheduled passenger by the flight number registration unit, the presentation unit excludes the scheduled passenger, and then presents the position information of the scheduled passenger between the passage point and the boarding gate.

Supplementary Note 5

The non-boarded passenger search device according to any one of Supplementary Notes 1 to 4, wherein, when the determination unit determines that a scheduled passenger whose face is photographed at the passage point is present in a plurality of scheduled passengers whose image data of faces are registered by the image registration unit, the flight number registration unit registers a flight number which the scheduled passenger is scheduled to board, in association with image data of the face of the scheduled passenger registered by the image registration unit.

Supplementary Note 6

The non-boarded passenger search device according to any one of Supplementary Notes 1 to 5, wherein, when the determination unit determines that a scheduled passenger whose face is photographed at the passage point is not present in a plurality of scheduled passengers whose image data of faces are registered by the image registration unit, the flight number registration unit registers a flight number which the scheduled passenger is scheduled to board, in association with image data of the face of the scheduled passenger photographed at the passage point.

Supplementary Note 7

A non-boarded passenger search method of searching for a non-boarded passenger in a terminal building of an airport, the method including:
registering image data of faces of a plurality of scheduled passengers photographed before a predetermined passage point on a path toward a boarding gate;
each time a face of a scheduled passenger is photographed at the passage point, comparing image data of the face with registered image data of faces of the plurality of scheduled passengers, and then determining whether a scheduled passenger whose face is photographed at the passage point is present in the plurality of registered scheduled passengers;
when a scheduled passenger whose face is photographed at the passage point is present in the plurality of registered scheduled passengers, registering a flight number which the scheduled passenger is scheduled to board, in association with image data of the face of the scheduled passenger; and
presenting position information of a scheduled passenger between the passage point and the boarding gate for each of the flight numbers, based on image data of a face of the scheduled passenger and a flight number associated with each other, image data of a face of a scheduled passenger photographed at a plurality of photographing points between the passage point and the boarding gate, and position information of the plurality of preset photographing points.

Supplementary Note 8

The non-boarded passenger search method according to Supplementary Note 7, further including: when a face of a given scheduled passenger is photographed at the plurality of photographing points, recording a photographing time for each of the photographing points in association with image data of the face of the given scheduled passenger; and
presenting a movement path of the given scheduled passenger as the position information of the scheduled passenger, based on a recorded photographing time for each of the photographing points and the position information of the plurality of preset photographing points.

Supplementary Note 9

The non-boarded passenger search method according to Supplementary Note 7 or 8, wherein
the passage point is located in a security check.

Supplementary Note 10

The non-boarded passenger search method according to any one of Supplementary Notes 7 to 9, further including:
registering a boarding gate of a flight which a scheduled passenger is scheduled to board, in association with image data of the face; and
in a case where a face of a scheduled passenger is photographed at a given boarding gate, when the boarding gate coincides with a boarding gate associated with image data of the face of the scheduled passenger, excluding the scheduled passenger, and then presenting the position information of the scheduled passenger between the passage point and the boarding gate.

Supplementary Note 11

The non-boarded passenger search method according to any one of Supplementary Notes 7 to 10, further including,
when a scheduled passenger whose face is photographed at the passage point is present in the plurality of scheduled passengers whose image data of faces are registered, registering a flight number which the scheduled passenger is scheduled to board, in association with registered image data of the face of the scheduled passenger.

Supplementary Note 12

The non-boarded passenger search method according to any one of Supplementary Notes 7 to 11, further including,
when a scheduled passenger whose face is photographed at the passage point is not present in the plurality of registered scheduled passengers, registering a flight number which the scheduled passenger is scheduled to board, in association with image data of the face of the scheduled passenger photographed at the passage point.

Supplementary Note 13

A program which causes a computer to search for a non-boarded passenger in a terminal building of an airport, the program causing the computer to execute:
registering image data of faces of a plurality of scheduled passengers photographed before a predetermined passage point on a path toward a boarding gate;
each time a face of a scheduled passenger is photographed at the passage point, comparing image data of the face with registered image data of faces of the plurality of scheduled passengers, and then determining whether a scheduled passenger whose face is photographed at the passage point is present in the plurality of registered scheduled passengers;

when a scheduled passenger whose face is photographed at the passage point is present in the plurality of registered scheduled passengers, registering a flight number which the scheduled passenger is scheduled to board, in association with image data of the face of the scheduled passenger; and presenting position information of a scheduled passenger between the passage point and the boarding gate for each of the flight numbers, based on image data of a face of the scheduled passenger and a flight number associated with each other, image data of a face of a scheduled passenger photographed at a plurality of photographing points between the passage point and the boarding gate, and position information of the plurality of preset photographing points.

Supplementary Note 14

The program according to Supplementary Note 13, further causing the computer to execute:

when a face of a given scheduled passenger is photographed at the plurality of photographing points, recording a photographing time for each of the photographing points in association with image data of the face of the given scheduled passenger; and presenting a movement path of the given scheduled passenger as the position information of the scheduled passenger, based on a recorded photographing time for each of the photographing points and the position information of the plurality of preset photographing points.

Supplementary Note 15

The program according to Supplementary Note 13 or 14, wherein the passage point is located in a security check.

Supplementary Note 16

The program according to any one of Supplementary Notes 13 to 15, further executing:

registering a boarding gate of a flight which a scheduled passenger is scheduled to board, in association with image data of the face; and in a case where a face of a scheduled passenger is photographed at a given boarding gate, when the boarding gate coincides with a boarding gate associated with image data of the face of the scheduled passenger, excluding the scheduled passenger, and then presenting the position information of the scheduled passenger between the passage point and the boarding gate.

Supplementary Note 17

The program according to any one of Supplementary Notes 13 to 16, further executing, when a scheduled passenger whose face is photographed at the passage point is present in the plurality of registered scheduled passengers, registering a flight number which the scheduled passenger is scheduled to board, in association with registered image data of the face of the scheduled passenger.

Supplementary Note 18

The program according to any one of Supplementary Notes 13 to 17, further executing, when a scheduled passenger whose face is photographed at the passage point is not present in the plurality of registered scheduled passengers, registering a flight number which the scheduled passenger is scheduled to board, in association with image data of the face of the scheduled passenger photographed at the passage point.

One aspect of the present invention has been described above with the above-described example embodiment as an exemplary example. However, one aspect of the present invention is not limited to the above-described example embodiment. In other words, various aspects that may be understood by a person skilled in the art are applicable to the one aspect of the present invention within the scope of the one aspect of the present invention.

This application is based upon and claims the benefit of priority from Japanese Patent Application No. 2016-249892, filed on Dec. 22, 2016, the disclosure of which is incorporated herein in its entirety by reference.

REFERENCE SIGNS LIST

10 Image registration unit
12 Determination unit
14 Flight number registration unit
16 Presentation unit
18 Storage unit
20 Photographing device for registration
22 Photographing device for determination
24 Input device
26 Photographing device for position determination
28 Photographing device for confirmation
30 Boarding gate
40 Scheduled passenger
50 Passage point
55 Security check
60 Photographing point
70 Terminal device
100 Non-boarded passenger search device
110 Computer
111 CPU
112 Main memory
113 Storage device
114 Input interface
115 Display controller
116 Data reader/writer
117 Communication interface
118 Input instrument
119 Display device
120 Recording medium
121 Bus
1000 Non-boarded passenger search system

What is claimed is:

1. A non-boarded passenger search device which searches for a non-boarded passenger in a terminal building of an airport, the device comprising:
   at least one memory configured to store instructions; and
   at least one processor configured to execute the instructions to:
   register image data of faces of a plurality of scheduled passengers photographed before a predetermined passage point on a path toward a boarding gate;
   each time a face of a scheduled passenger is photographed at the passage point, compare image data of the face with the image data of faces of the plurality of scheduled passengers registered, and then determine whether a scheduled passenger whose face is photographed at the passage point is present in a plurality of scheduled passengers whose the image data of faces are registered;
   when determining the scheduled passenger whose face is photographed at the passage point is present in the plurality of scheduled passengers whose the image data of faces are registered, register a flight number which the scheduled passenger is scheduled to board, in association with image data of the face of the scheduled passenger; and
   present position information of a scheduled passenger between the passage point and the boarding gate for each of the flight numbers, based on the image data of the face of the scheduled passenger and the flight number associated, the image data of the face of the scheduled passenger photographed at the plurality of photographing points between the passage point and the boarding gate, and position information of the plurality of preset photographing points.

2. The non-boarded passenger search device according to claim 1, wherein,
the processor configured to execute the instructions to:
when a face of a given scheduled passenger is photographed at the plurality of photographing points, register a photographing time for each of the photographing points in association with image data of the face of the given scheduled passenger; and
present a movement path of the given scheduled passenger as the position information of the scheduled passenger, based on a photographing time for each of the registered photographing points and the position information of the plurality of preset photographing points.

3. The non-boarded passenger search device according to claim 1, wherein
the passage point is located in a security check.

4. The non-boarded passenger search device according to claim 1, wherein
the processor further configured to execute the instructions to:
register a boarding gate of a flight which a scheduled passenger is scheduled to board, in association with image data of the face; and
in a case where a face of a scheduled passenger is photographed at a given boarding gate, when the boarding gate coincides with a boarding gate associated with image data of the face of the scheduled passenger, exclude the scheduled passenger, and then present the position information of the scheduled passenger between the passage point and the boarding gate.

5. The non-boarded passenger search device according to claim 1, wherein,
the processor configured to execute the instructions to:
when determining that a scheduled passenger whose face is photographed at the passage point is present in a plurality of scheduled passengers whose image data of faces are registered, register a flight number which the scheduled passenger is scheduled to board, in association with image data of the face of the scheduled passenger registered.

6. The non-boarded passenger search device according to claim 1, wherein,
the processor configured to execute the instructions to:
when determining that a scheduled passenger whose face is photographed at the passage point is not present in a plurality of scheduled passengers whose image data of faces are registered, register a flight number which the scheduled passenger is scheduled to board, in association with image data of the face of the scheduled passenger photographed at the passage point.

7. A non-boarded passenger search method of searching for a non-boarded passenger in a terminal building of an airport, the method comprising:
registering image data of faces of a plurality of scheduled passengers photographed before a predetermined passage point on a path toward a boarding gate;
each time a face of a scheduled passenger is photographed at the passage point, comparing image data of the face with registered image data of faces of the plurality of scheduled passengers, and then determining whether a scheduled passenger whose face is photographed at the passage point is present in the plurality of registered scheduled passengers;
when the scheduled passenger whose face is photographed at the passage point is present in the plurality of registered scheduled passengers, registering a flight number which the scheduled passenger is scheduled to board, in association with image data of the face of the scheduled passenger; and
presenting position information of a scheduled passenger between the passage point and the boarding gate for each of the flight numbers, based on the image data of the face of the scheduled passenger and the flight number associated, the image data of the face of the scheduled passenger photographed at the plurality of photographing points between the passage point and the boarding gate, and position information of the plurality of preset photographing points.

8. The non-boarded passenger search method according to claim 7, further comprising:
when a face of a given scheduled passenger is photographed at the plurality of photographing points, recording a photographing time for each of the photographing points in association with image data of the face of the given scheduled passenger; and
presenting a movement path of the given scheduled passenger as the position information of the scheduled passenger, based on a recorded photographing time for each of the photographing points and the position information of the plurality of preset photographing points.

9. The non-boarded passenger search method according to claim 7, wherein
the passage point is located in a security check.

10. The non-boarded passenger search method according to claim 7, further comprising:
registering a boarding gate of a flight which a scheduled passenger is scheduled to board, in association with image data of the face; and
in a case where a face of a scheduled passenger is photographed at a given boarding gate, when the boarding gate coincides with a boarding gate associated with image data of the face of the scheduled passenger, excluding the scheduled passenger, and then presenting the position information of the scheduled passenger between the passage point and the boarding gate.

11. The non-boarded passenger search method according to claim 7, further comprising,
when a scheduled passenger whose face is photographed at the passage point is present in the plurality of scheduled passengers whose image data of faces are registered, registering a flight number which the scheduled passenger is scheduled to board, in association with registered image data of the face of the scheduled passenger.

12. The non-boarded passenger search method according to claim 7, further comprising,
when a scheduled passenger whose face is photographed at the passage point is not present in the plurality of registered scheduled passengers, registering a flight number which the scheduled passenger is scheduled to board, in association with image data of the face of the scheduled passenger photographed at the passage point.

13. A non-transitory computer-readable recording medium storing a program which causes a computer to search for a non-boarded passenger in a terminal building of an airport, the program causing the computer to execute:

registering image data of faces of a plurality of scheduled passengers photographed before a predetermined passage point on a path toward a boarding gate;

each time a face of a scheduled passenger is photographed at the passage point, comparing image data of the face with registered image data of faces of the plurality of scheduled passengers, and then determining whether a scheduled passenger whose face is photographed at the passage point is present in the plurality of registered scheduled passengers;

when a scheduled passenger whose face is photographed at the passage point is present in the plurality of registered scheduled passengers, registering a flight number which the scheduled passenger is scheduled to board, in association with image data of the face of the scheduled passenger; and presenting position information of a scheduled passenger between the passage point and the boarding gate for each of the flight numbers, based on the image data of the face of the scheduled passenger and the flight number associated, the image data of the face of the scheduled passenger photographed at the plurality of photographing points between the passage point and the boarding gate, and position information of the plurality of preset photographing points.

14. The recording medium storing the program according to claim 13, the program further causing the computer to execute:

when a face of a given scheduled passenger is photographed at the plurality of photographing points, recording a photographing time for each of the photographing points in association with image data of the face of the given scheduled passenger; and presenting a movement path of the given scheduled passenger as the position information of the scheduled passenger, based on a recorded photographing time for each of the photographing points and the position information of the plurality of preset photographing points.

15. The recording medium storing the program according to claim 13, wherein the passage point is located in a security check.

16. The recording medium storing the program according to claim 13, the program further executing:

registering a boarding gate of a flight which a scheduled passenger is scheduled to board, in association with image data of the face; and in a case where a face of a scheduled passenger is photographed at a given boarding gate, when the boarding gate coincides with a boarding gate associated with image data of the face of the scheduled passenger, excluding the scheduled passenger, and then presenting the position information of the scheduled passenger between the passage point and the boarding gate.

17. The recording medium storing the program according to claim 13, the program further executing, when a scheduled passenger whose face is photographed at the passage point is present in the plurality of registered scheduled passengers, registering a flight number which the scheduled passenger is scheduled to board, in association with registered image data of the face of the scheduled passenger.

18. The recording medium storing the program according to claim 13, the program further executing, when a scheduled passenger whose face is photographed at the passage point is not present in the plurality of registered scheduled passengers, registering a flight number which the scheduled passenger is scheduled to board, in association with image data of the face of the scheduled passenger photographed at the passage point.

* * * * *